United States Patent
Kotkas et al.

(10) Patent No.: US 12,074,781 B2
(45) Date of Patent: Aug. 27, 2024

(54) AUTOMATED TESTING OF A DATA SERVICE

(71) Applicant: Twilio Inc., San Francisco, CA (US)

(72) Inventors: Henrik Kotkas, Tallinn (EE); Hannes Rootsi, Tallinn (EE); Riivo Kikas, Tartu (EE); Holger Biene, Elva (EE)

(73) Assignee: Twilio Inc., San Francisco, CA (US)

( * ) Notice: Subject to any disclaimer, the term of this patent is extended or adjusted under 35 U.S.C. 154(b) by 30 days.

(21) Appl. No.: 17/865,352

(22) Filed: Jul. 14, 2022

(65) Prior Publication Data
US 2024/0022495 A1    Jan. 18, 2024

(51) Int. Cl.
*H04L 43/55*    (2022.01)
*H04L 43/106*   (2022.01)
*H04L 45/302*   (2022.01)

(52) U.S. Cl.
CPC ............ *H04L 43/55* (2022.05); *H04L 43/106* (2013.01); *H04L 45/3065* (2013.01)

(58) Field of Classification Search
CPC ... H04L 43/106; H04L 43/55; H04L 45/3065; H04L 41/5003; H04L 41/5009; H04L 41/5019; H04L 51/5025; H04L 47/822; H04L 67/60; H04L 67/61
See application file for complete search history.

(56) References Cited

U.S. PATENT DOCUMENTS

| 11,734,614 B1 * | 8/2023 | Wang ..................... G06N 3/044 706/12 |
| 2020/0245168 A1 * | 7/2020 | Ketonen .................. H04L 43/55 |

FOREIGN PATENT DOCUMENTS

| WO | WO-2017212410 A1 * | 12/2017 | |
| WO | WO-2018231693 A1 * | 12/2018 | ........... G06F 9/5038 |

* cited by examiner

*Primary Examiner* — James E Springer
*Assistant Examiner* — Patrick F Ngankam
(74) *Attorney, Agent, or Firm* — Lowenstein Sandler LLP

(57) ABSTRACT

A machine selects a candidate data service to be tested for service quality. The machine performs a first-phase test of the candidate data service by providing predetermined input data to the candidate data service and measuring a first quality metric that results. The machine may determine that the candidate data service is to undergo the second-phase test based on the first quality metric, and the machine may accordingly perform the second-phase test of the candidate data service. The second-phase test may include: adding the candidate data service to a pool of five data services processing undetermined input data; routing a portion of the undetermined input data to the candidate data service; and measuring a second quality metric resultant from the candidate data service processing the routed portion. Based on the second quality metric, the machine may record whether the candidate data service is to remain in the pool.

20 Claims, 5 Drawing Sheets

AUTOMATED TESTING OF A DATA SERVICE

TECHNICAL FIELD

The subject matter disclosed herein generally relates to the technical field of special-purpose machines that facilitate automated testing of machines, services provided by such machines, or both, including software-configured computerized variants of such special-purpose machines and improvements to such variants, and to the technologies by which such special-purpose machines become improved compared to other special-purpose machines that facilitate automated testing of machines, services provided by such machines, or both. Specifically, the present disclosure addresses systems and methods to facilitate automated testing of one or more machines that provide one or more data services.

BACKGROUND

A machine may be configured to interact with one or more users by providing a data service. Examples of such data services include communications services (e.g., phone calls, text messages, or both, between or among two or more users), transaction services (e.g., orders, payments, authorizations, denials, or any suitable combination thereof), usage services (e.g., logs, alerts, statuses, state changes, or any suitable combination thereof), file transfer services (e.g., cloud storage, cloud access, or both), or any suitable combination thereof.

BRIEF DESCRIPTION OF THE DRAWINGS

Some embodiments are illustrated by way of example and not limitation in the figures of the accompanying drawings.

DETAILED DESCRIPTION

Figure 1:
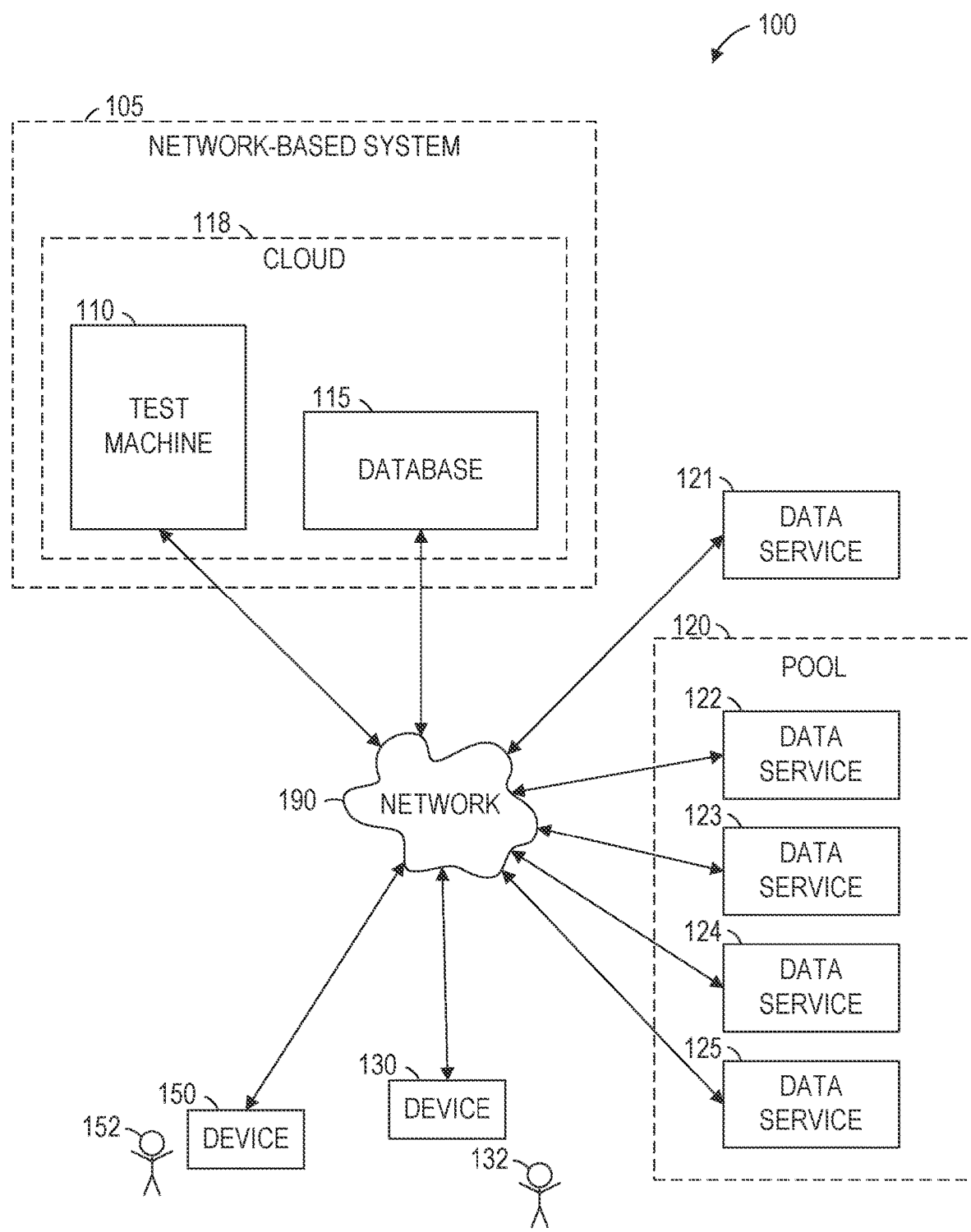
FIG. 1 is a network diagram illustrating a network environment suitable for automated testing of a data service, according to some example embodiments.

Example methods (e.g., algorithms) facilitate automated testing of one or more data services, and example systems (e.g., special-purpose machines configured by special-purpose software) are configured to facilitate automated testing of one or more data services. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine (e.g., a server machine, a test machine, a client machine, a peer-to-peer machine, or any suitable combination thereof, operating in a network of machines) is configured (e.g., by suitable software, hardware, or a combination of both) to perform automated testing of a data service. The machine selects a candidate data service to be tested for service quality. The machine then performs a first-phase test of the selected candidate data service by providing predetermined input data (e.g., predetermined reference test input data) to the selected candidate data service and measuring a first quality metric that results from the selected candidate data service processing the predetermined input data. The machine next determines whether the selected candidate data service is to undergo a second-phase test, and this determination may be made based on the first quality metric that resulted from the selected candidate data service processing the predetermined input data. Hence, the machine may determine that the candidate data service is indeed to undergo the second-phase test based on the first quality metric resultant from the candidate data service processing the predetermined input data.

Based on this determination, the machine may then perform the second-phase test of the candidate data service. The second-phase test may include, for example: adding the candidate data service to a pool of live data services processing undetermined input data (e.g., input data that is not predetermined, such as non-determined live user data from real-time live provision of one or more real-time live data services, non-determined live sensor measurements from one or more sensors producing real-time live sensor data, non-determined live data from any other data source, or any suitable combination thereof); routing a portion of the undetermined input data to the candidate data service; and measuring a second quality metric that results from the candidate data service processing the routed portion of the undetermined input data processed by the pool of live data services. Based on the resultant second quality metric, the machine may then record (e.g., within a data structure stored in memory, in a database, or both) whether the candidate data service is to remain in the pool. Further details are discussed below.

FIG. 1 is a network diagram illustrating a network environment 100 suitable for automated testing of a data service, according to some example embodiments. The network environment 100 includes a test machine 110, a database 115, data services 121-125 (e.g., data server clouds of one or more data server machines providing respectively corresponding data services), and devices 130 and 150, all communicatively coupled to each other via a network 190. The test machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). The data services 122-125 may form all or part of a pool 120 of data services, and the data services 122-125 in the pool 120 may be or include live data services presently (e.g., currently or already) processing undetermined input data (e.g., live user data). The test machine 110, the database 115, the data services 121-125 (e.g., whether inside the pool 120 or outside the pool 120), and the devices 130 and 150 may each be implemented in a special-purpose (e.g., specialized) computer system, in whole or in part, as described below with respect to FIG. 5.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 5, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured in any of various ways, for example, as a text file, a table, a spreadsheet, a relational database (e.g., an object-relational database), a triple store, a hierarchical data store, a document database, a graph database, key-value pairs, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
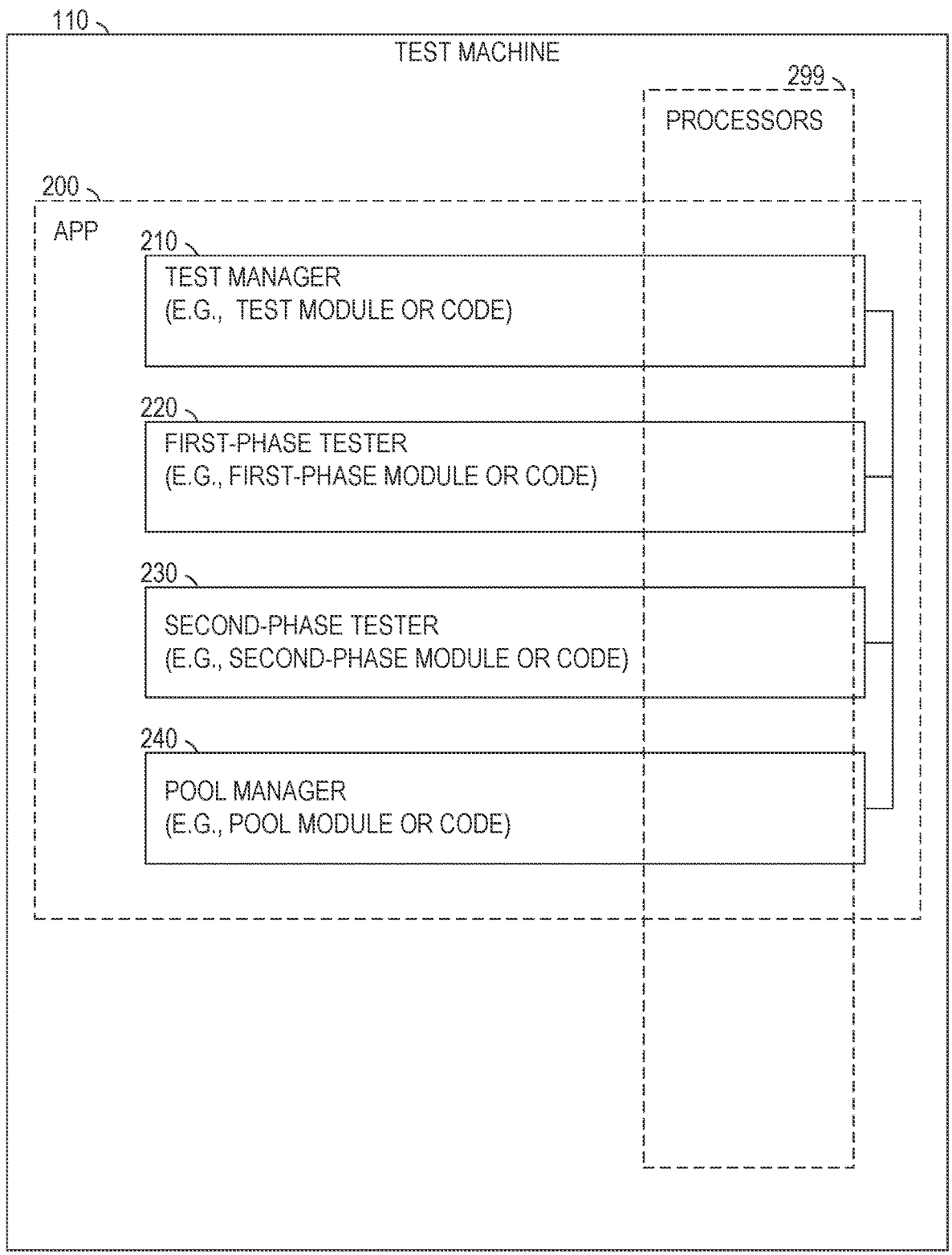
FIG. 2 is a block diagram illustrating components of a test machine suitably configured for automated testing of a data service, according to some example embodiments.

FIG. 2 is a block diagram illustrating components of the test machine 110, configured for automated testing of a data service (e.g., data service 121), according to some example embodiments. The test machine 110 is shown as including a test manager 210 (e.g., a test module or software code suitable for managing automated testing), a first-phase tester 220 (e.g., a first-phase module or software code suitable for performing a first phase of an automated test), a second-phase tester 230 (e.g., a second-phase module or software code for performing a second phase of the automated test), and a pool manager 240 (e.g., a pool module or software code for managing the pool 120 of data services (e.g., data services 122, 123, 124, and 125), all configured to communicate with each other (e.g., via a bus, shared memory, or a switch).

As shown in FIG. 2, the test manager 210, the first-phase tester 220, the second-phase tester 230, the pool manager 240, or any suitable combination thereof, may form all or part of an app 200 (e.g., a test app, a server app, a peer-to-peer, a client app, or any suitable combination thereof) that is stored (e.g., installed) on the test machine 110 (e.g., responsive to or otherwise as a result of data being received via the network 190). Furthermore, one or more processors 299 (e.g., hardware processors, digital processors, or any suitable combination thereof) may be included (e.g., temporarily or permanently) in the app 200, the test manager 210, the first-phase tester 220, the second-phase tester 230, the pool manager 240, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 3:
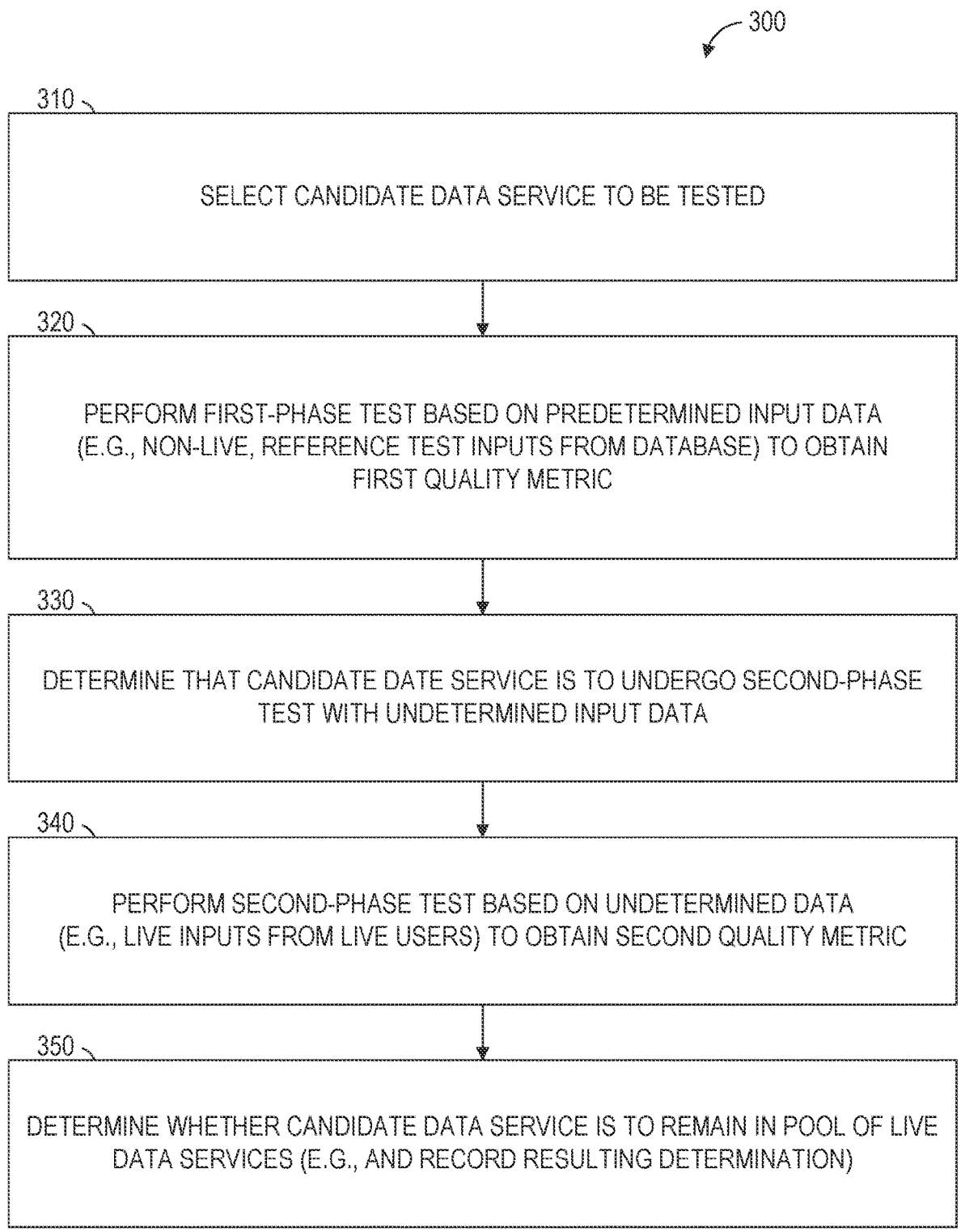
FIGS. 3 and 4 are flowcharts illustrating operations of the test machine in performing a method of automated testing of a data service, according to some example embodiments.
Figure 4:
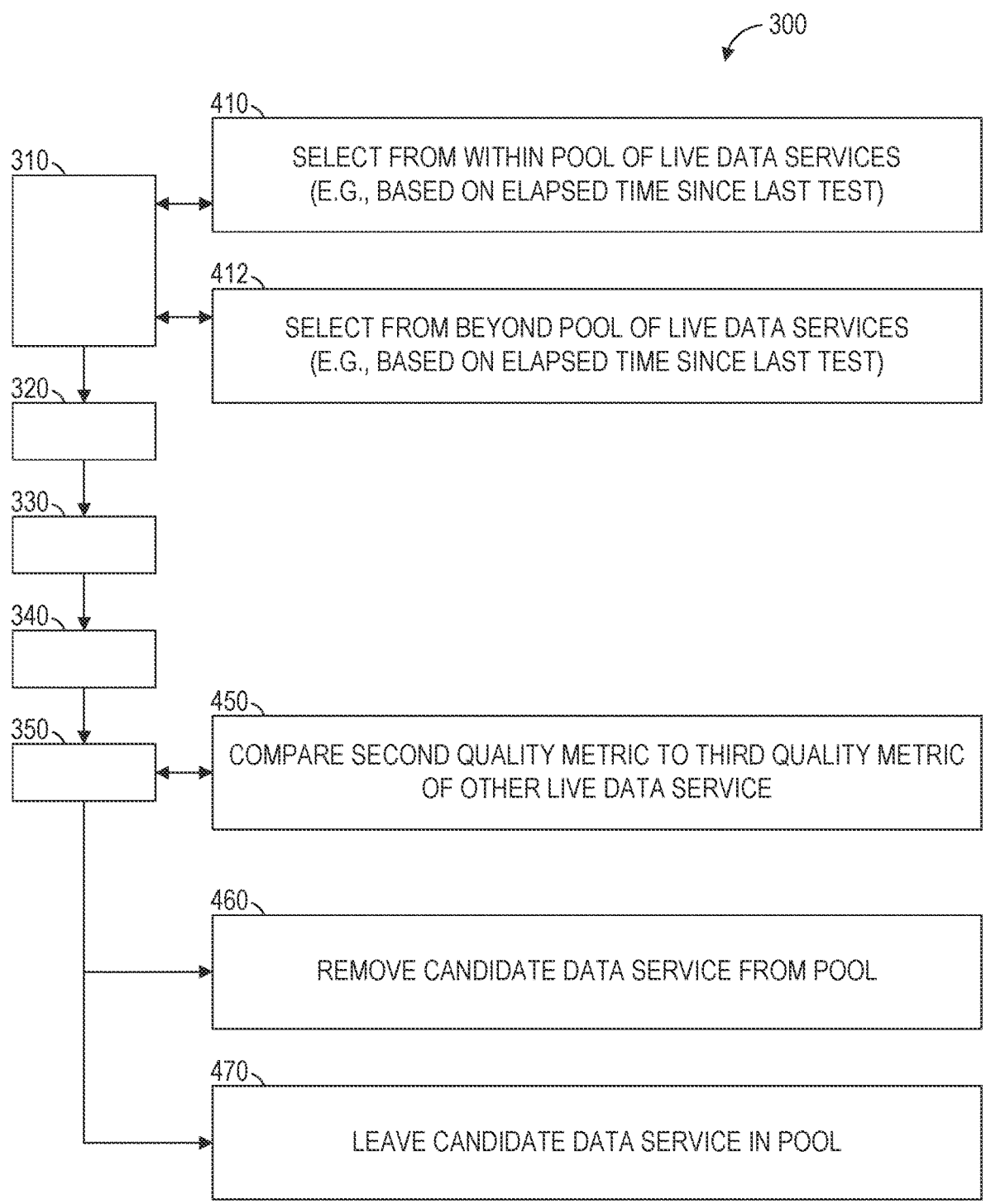

FIGS. 3 and 4 are flowcharts illustrating operations of the test machine 110 in performing a method 300 to automatically test a data service (e.g., data service 121 or 122), according to some example embodiments. Operations in the method 300 may be performed by the test machine 110, using components (e.g., modules) described above with respect to FIG. 2, using one or more processors (e.g., microprocessors or other hardware processors), or using any suitable combination thereof. As shown in FIG. 3, the method 300 includes operations 310, 320, 330, 340, and 350.

In operation 310, the test manager 210 selects a candidate data service (e.g., data service 121 or 122) to be tested for service quality. Example parameters that characterize service quality include: error rates for data submissions to the candidate data service, for acknowledgements of such data submissions, or for both, latencies for data submissions to the candidate data service, for acknowledgements of such data submissions, or for both, error rates for delivery receipts from the candidate data service, latencies for such delivery receipts, or any suitable combination thereof.

In operation 320, the first-phase tester 220 performs or otherwise causes to be performed a first-phase test of the selected candidate data service (e.g., data service 121 or 122) by providing predetermined input data to the candidate data service and measuring a first quality metric that results from the candidate data service processing the predetermined input data. As noted above, the predetermined input data may be or include predetermined reference test input data (e.g., a reference test message, which may be stored by the test machine 110, the database 115, or both). The use of such predetermined input data may provide benefits in consistency, uniformity, reliability, or any suitable combination thereof, in test results Obtained (e.g., resultant) from the first-phase test across various data services of varying levels of service quality.

In some example embodiments, the candidate data service (e.g., data service 121 or 122) is not configured to directly provide the first quality metric as a result of the candidate data service processing the predetermined input data. However, one or more communicatively coupled systems (e.g., devices 130 and 150, each of which may be a handset device, such as a smartphone) may be configured to generate, measure, calculate or otherwise provide the first quality metric, based on the candidate data service processing the predetermined input data.

In certain implementations, at least one of the one or more communicatively coupled systems provides the first quality metric to the test machine 110 (e.g., to the first-phase tester 220). In alternative implementations, at least one of the one or more communicatively coupled systems provides the first quality metric to a server (e.g., accessible via the network 190, such as the database 115), and the test machine 110 (e.g., the first-phase tester 220) accesses the first quality metric from the server (e.g., database 115). After accessing or otherwise obtaining the first quality metric, the test machine 110 may store the first quality metric for future use.

In operation 330, the test manager 210 determines (e.g., decides) that the selected candidate data service (e.g., data service 121 or is to undergo a second-phase test. This determination may be made based on the first quality metric that resulted from the candidate data service processing the predetermined input data (e.g., in the first-phase test performed in operation 320).

In operation 340, the second-phase tester 230 performs or otherwise causes to be performed the second-phase test of the selected candidate data service (e.g., data service 121 or 122), in accordance with the determination made in operation 330. The second-phase test may include one or more of the following sub-operations: (1) adding the candidate data service to the pool 120 of live data services processing undetermined input data (e.g., live user data, live sensor data, or both); (2) routing a portion of the undetermined input data (e.g., a portion of the live user data) to the candidate data service; and (3) measuring a second quality metric that results from the candidate data service processing the routed portion of the undetermined input data processed by the pool 120 of live data services. In some example embodiments, the pool manager 240 (e.g., under control of the second-phase tester 230) performs the adding of the candidate data service to the pool 120.

In some example embodiments, the candidate data service (e.g., data service 121 or 122) is not configured to directly provide the second quality metric as a result of the candidate data service processing the undetermined input data (e.g., live user data, such as one or more live Short Message Service (SMS) messages sent from the device 130 to the device 150). However, one or more communicatively coupled systems (e.g., a server machine, such as a webserver machine) may be configured to generate, measure, calculate or otherwise provide the second quality metric based on the candidate data service processing the undetermined input data. For example, an SMS message sent from the device 130 to the device 150 may contain or be accompanied with a code (e.g., a Personal Identification Number (PIN) code) corresponding to a website and its underlying webserver. If the user 152 of the device 150 enters the code at the corresponding website, the underlying webserver may provide the second quality metric based on the accuracy of the entered code.

In certain implementations, at least one of the one or more communicatively coupled systems provides the second quality metric to the test machine 110 (e.g., to the second-phase tester 230). In alternative implementations, at least one of the one or more communicatively coupled systems provides the second quality metric to a server (e.g., accessible via the network 190, such as the database 115), and the test machine 110 (e.g., the first-phase tester 220) accesses the second quality metric from the server (e.g., database 115). After accessing or otherwise obtaining the second quality metric, the test machine 110 may store the second quality metric for future use.

In operation 350, the pool manager 240 records within a data structure (e.g., stored by the test machine 110, the database 115, or both) whether the selected candidate data service (e.g., data service 121 or 122) is to remain included in the pool 120. The recording of whether the selected candidate data service is to remain in the pool 120 may be based on the second quality metric. For example, based on the second quality metric, the pool manager 240 may record within the data structure that the candidate data service is indeed to remain included in the pool 120 of live data services. As another example, based on the second quality metric, the pool manager 240 may record within the data structure that the candidate data service is not to remain in the pool 120 of live data services (e.g., that the candidate data service is to be removed or otherwise excluded from the pool 120).

As shown in FIG. 4, in addition to any one or more of the operations previously described, the method 300 may include one or more of operations 410, 412, 450, 460, and 470.

In some example embodiments, operation 410 is performed as part (e.g., a precursor task, a subroutine, or a portion) of operation 310, in which the test manager 210 selects the candidate data service (e.g., data service 121 or 122) to be tested for service quality. In operation 410, the test manager 210 selects the candidate data service (e.g., data service 122) from among the data services (e.g., data services 122-125) already included within the pool 120 of data services that are collectively processing the undetermined input data (e.g., live user data). According to various example embodiments, the selection of the candidate data service (e.g., from within the pool 120) may be based on an amount of time (e.g., a predetermined threshold period of time) elapsed since the same candidate data service was previously (e.g., most recently) tested (e.g., by the test machine 110) for service quality.

In alternative example embodiments, operation 412 is performed as part (e.g., a precursor task, a subroutine, or a portion) of operation 310, in which the test manager 210 selects the candidate data service (e.g., data service 121 or 122) to be tested for service quality. In operation 412, the test manager 210 selects the candidate data service (e.g., data service 121) from among one or more available data services that are outside (e.g., excluded from or omitted from) the pool 120 of data services that are collectively processing the undetermined input data (e.g., live user data). According to various example embodiments, the selection of the candidate data service (e.g., from beyond the pool 120) may be based on an amount of time (e.g., a predetermined threshold period of time) elapsed since the same candidate data service was previously (e.g., most recently) tested (e.g., by the test machine 110) for service quality.

Operation 450 may be performed as part of operation 350, in which the pool manager 240 records within the data structure whether the selected candidate data service (e.g., data service 121 or 122) is to remain included in the pool 120. In operation 450, the pool manager 240 determines (e.g., automatically decides, selects, or chooses) whether or not the candidate data service is to remain within the pool 120 based on a comparison of the second quality metric (e.g., that resulted from the second-phase test performed in operation 340) to a third quality metric that results from a different (e.g., further) data service (e.g., data service 123) in the pool 120 processing a different portion of the undetermined input data (e.g., another portion of the live user data being processed by the pool 120 of live data services). Accordingly, as a result of operation 450 being performed, the data structure may be caused to indicate whether the candidate data service is to remain in the pool 120 based on a comparison of the candidate data service's quality of service to another, known (e.g., reference) data service's quality of service when both data services are processing undetermined input data (e.g., live user data) while operating in the same pool 120 of data services.

In some example embodiments, operation 460 is performed after operation 350, based on the performance of operation 450 resulting in the data structure indicating that the selected candidate data service (e.g., data service 121 or 122) is not to remain in the pool 120. In operation 460, the pool manager 240 removes (e.g., affirmatively or passively excludes) the candidate data service from the pool 120 based on the data structure indicating that the candidate data service is not to remain in the pool. Accordingly, as a result of operation 460 being performed, the candidate data service is no longer in the pool 120 of data services and thus no longer is provided with any of the undetermined input data (e.g., live user data) being processed by the data services (e.g., data services 123-125) that remain in the pool 120.

In alternative example embodiments, operation 470 is performed after operation 350, based on the performance of operation 450 resulting in the data structure indicating that the selected candidate data service (e.g., data service 121 or 122) is indeed to remain in the pool 120. In operation 460, the pool manager 240 leaves (e.g., affirmatively or passively permits) the candidate data service in the pool 120 based on the data structure indicating that the candidate data service is to remain in the pool. Accordingly, as a result of operation 470 being performed, the candidate data service remains in the pool 120 of data services and thus continues to be provided with some portion of the undetermined input data (e.g., live user data) being processed by the other data services (e.g., data services 123-125) in the pool 120.

According to various example embodiments, one or more of the methodologies described herein may facilitate automated testing of a data service. Moreover, one or more of the methodologies described herein may facilitate periodic, regular, or otherwise repeated automated testing of a data service (e.g., after expiration of a predetermined threshold span of time since that data service was last tested). Hence, one or more of the methodologies described herein may facilitate ongoing testing of data services, as well as ongoing additions and removals of automatically tested data services from one or more pools of data services, compared to capabilities of pre-existing systems and methods.

When these effects are considered in aggregate, one or more of the methodologies described herein may obviate a need for certain efforts or resources that otherwise would be involved in automated (e.g., machine performed) testing of a data service. Efforts expended by a user in manual (e.g., human performed) testing of a data service may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 5:
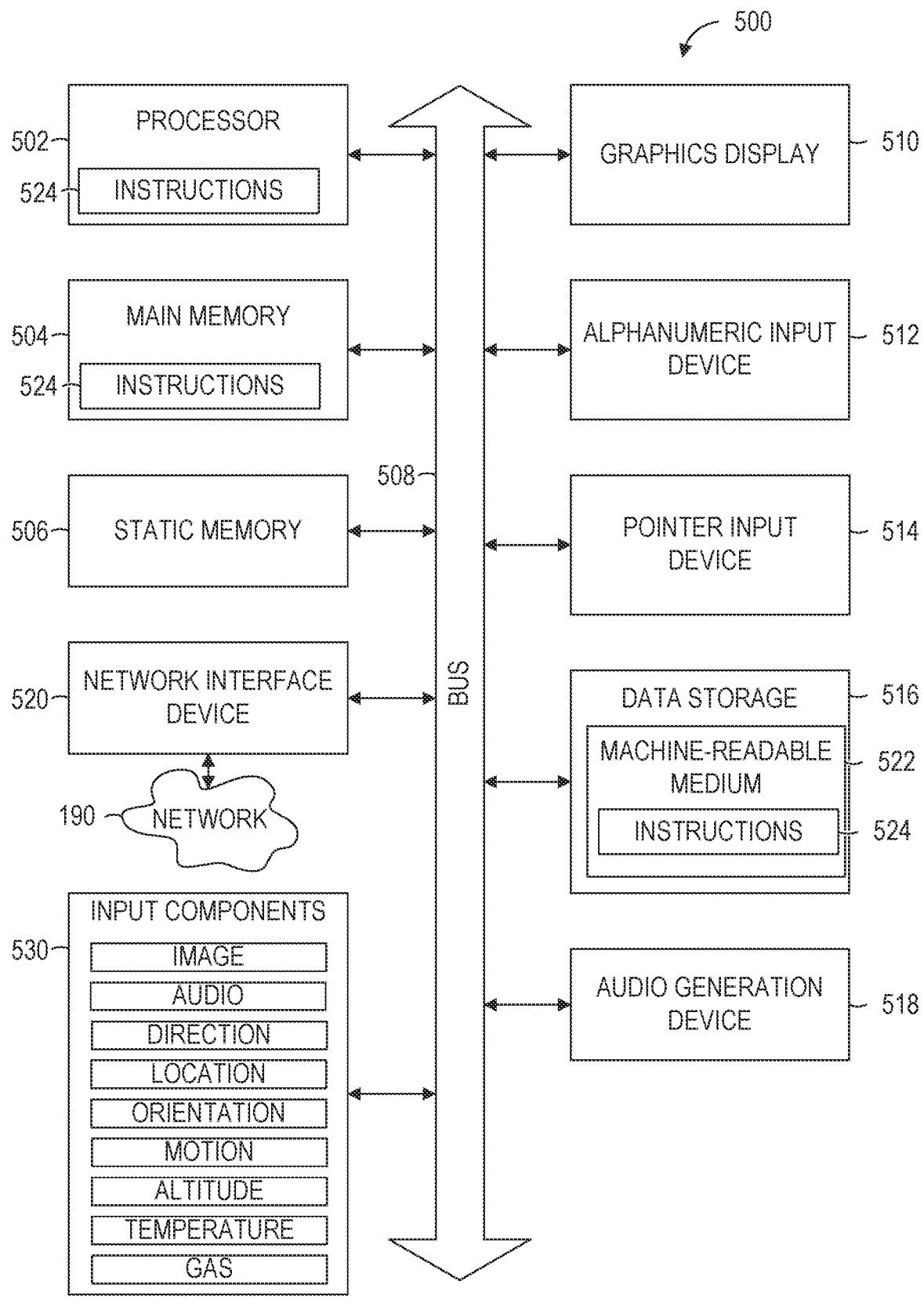
FIG. 5 is a block diagram illustrating components of a machine, according to some example embodiments, able to read instructions from a machine-readable medium and perform any one or more of the methodologies discussed herein.

FIG. 5 is a block diagram illustrating components of a machine 500, according to some example embodiments, able to read instructions 524 from a machine-readable medium 522 (e.g., a non-transitory machine-readable medium, a machine-readable storage medium, a computer-readable storage medium, or any suitable combination thereof) and perform any one or more of the methodologies discussed herein, in whole or in part. Specifically, FIG. 5 shows the machine 500 in the example form of a computer system (e.g., a computer) within which the instructions 524 (e.g., software, a program, an application, an apples, an app, or other executable code) for causing the machine 500 to perform any one or more of the methodologies discussed herein may be executed, in whole or in part.

In alternative embodiments, the machine 500 operates as a standalone device or may be communicatively coupled (e.g., networked) to other machines. In a networked deployment, the machine 500 may operate in the capacity of a server machine or a client machine in a server-client network environment, or as a peer machine in a distributed (e.g., peer-to-peer) network environment. The machine 500 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 524, sequentially or otherwise, that specify actions to be taken by that machine. Further, while only a single machine is illustrated, the term "machine" shall also be taken to include any collection of machines that individually or jointly execute the instructions 524 to perform all or part of any one or more of the methodologies discussed herein.

The machine 500 includes a processor 502. (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 504, and a static memory 506, which are configured to communicate with each other via a bus 508. The processor 502 contains solid-state digital microcircuits (e.g., electronic, optical, or both) that are configurable, temporarily or permanently, by some or all of the instructions 524 such that the processor 502 is configurable to perform any one or more of the methodologies described herein, in whole or in part. For example, a set of one or more microcircuits of the processor 502 may be configurable to execute one or more modules (e.g., software modules) described herein. In some example embodiments, the processor 502 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 500 with at least the processor 502, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 500 may further include a graphics display 510 (e.g., a plasma display panel (PDP), a light emitting diode (LED) display, a liquid crystal display (LCD), a projector, a cathode ray tube (CRT), or any other display capable of displaying graphics or video). The machine 500 may also include an alphanumeric input device 512 (e.g., a keyboard or keypad), a pointer input device 514 (e.g., a mouse, a touchpad, a touchscreen, a trackball, a joystick, a stylus, a motion sensor, an eye tracking device, a data glove, or other pointing instrument), a data storage 516, an audio generation device 518 (e.g., a sound card, an amplifier, a speaker, a headphone jack, or any suitable combination thereof), and a network interface device 520.

The data storage 516 (e.g., a data storage device) includes the machine-readable medium 522 (e.g., a tangible and non-transitory machine-readable storage medium) on which are stored the instructions 524 embodying any one or more of the methodologies or functions described herein. The instructions 524 may also reside, completely or at least partially, within the main memory 504, within the static memory 506, within the processor 502 (e.g., within the processor's cache memory), or any suitable combination thereof, before or during execution thereof by the machine 500. Accordingly, the main memory 504, the static memory 506, and the processor 502 may be considered machine-readable media (e.g., tangible and non-transitory machine-readable media). The instructions 524 may be transmitted or received over the network 190 via the network interface device 520. For example, the network interface device 520 may communicate the instructions 524 using any one or more transfer protocols (e.g., hypertext transfer protocol (HTTP)).

In some example embodiments, the machine 500 may be a portable computing device (e.g., a smart phone, a tablet computer, or a wearable device) and may have one or more additional input components 530 (e.g., sensors or gauges). Examples of such input components 530 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 530 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 522 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 524 for execution by the machine 500, such that the instructions 524, when executed by one or more processors of the machine 500 (e.g., processor 502), cause the machine 500 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 524 for execution by the machine 500 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 524).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times, Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems e.g., machines, devices, or other apparatus) discussed herein. Any one or more features of an example, taken in isolation or combination, should be considered as being within the disclosure of this application.

A first example provides a method comprising:
 selecting, by one or more processors, a candidate data service to be tested for service quality;
 performing, by the one or more processors, a first-phase test of the candidate data service by providing predetermined input data to the candidate data service and measuring a first quality metric resultant from the candidate data service processing the predetermined input data;
 determining, by the one or more processors, that the candidate data service is to undergo a second-phase test based on the first quality metric resultant from the candidate data service processing the predetermined input data;
 performing, by the one or more processors, the second-phase test of the candidate data service, the second-phase test including: adding the candidate data service to a pool of live data services processing undetermined input data; routing a portion of the undetermined input data to the candidate data service; and measuring a second quality metric resultant from the candidate data service processing the routed portion of the undetermined input data processed by the pool of live data services; and
 recording, by the one or more processors, within a data structure whether the candidate data service is to remain in the pool based on the second quality metric.

A second example provides a method according to the first example, wherein:
 the recording within the data structure of whether the candidate data service is to remain in the pool is based on a comparison of the second quality metric resultant from the candidate data service processing the routed portion of the undetermined input data processed by the pool of live data services to a third quality metric resultant from a different live data service in the pool of live data services processing a further portion of the undetermined input data.

A third example provides a method according to the first example or the second example, wherein:
 the selecting of the candidate data service selects the candidate data service from among the pool of live data services processing the undetermined input data.

A fourth example provides a method according to the third example, wherein:
 the selecting of the candidate data service from among the pool of live data services is based on expiration of a threshold period of time elapsed since the candidate data service was last tested for service quality.

A fifth example provides a method according to the first example or the second example, wherein:
 the selecting of the candidate data service selects an available data service outside the pool of live data services processing the undetermined input data.

A sixth example provides a method according to the fifth example, wherein:
 the selecting of the available data service outside the pool of live data services is based on expiration of a threshold period of time elapsed since the available data service was last tested for service quality.

A seventh example provides a method according to any of the first through sixth examples, wherein:
 the data structure indicates that the candidate data service is not to remain in the pool of live data services; and the method further comprises:
 removing the candidate data service from the pool of live data services based on the data structure indicating that the candidate data service is not to remain in the pool.

An eighth example provides a method according to any of the first through sixth examples, wherein:
 the data structure indicates that the candidate data service is to remain in the pool of live data services; and the method further comprises:
 leaving the candidate data service in the pool of live data services based on the data structure indicating that the candidate data service is to remain in the pool.

A ninth example provides a method according to any of the first through eighth examples, wherein:
 the candidate data service includes a candidate communications service;
 the predetermined input data include a reference test message;
 the first quality metric is resultant from the candidate communications service processing at least the reference test message;
 the pool of live data services include a live communications service;
 the undetermined input data include live user messages; and
 the second quality metric is resultant from the candidate communications service processing a routed portion of the live user messages.

A tenth example provides a machine-readable medium (e.g., a non-transitory machine-readable storage medium) comprising instructions that, when executed by one or more processors of a machine, cause the machine to perform operations comprising:
 selecting a candidate data service to be tested for service quality;

performing a first-phase test of the candidate data service by providing predetermined input data to the candidate data service and measuring a first quality metric resultant from the candidate data service processing the predetermined input data;

determining that the candidate data service is to undergo a second-phase test based on the first quality metric resultant from the candidate data service processing the predetermined input data;

performing the second-phase test of the candidate data service, the second-phase test including: adding the candidate data service to a pool of live data services processing undetermined input data; routing a portion of the undetermined input data to the candidate data service; and measuring a second quality metric resultant from the candidate data service processing the routed portion of the undetermined input data processed by the pool of live data services; and recording within a data structure whether the candidate data service is to remain in the pool based on the second quality metric.

An eleventh example provides a machine-readable medium according to the tenth example, wherein:

the recording within the data structure of whether the candidate data service is to remain in the pool is based on a comparison of the second quality metric resultant from the candidate data service processing the routed portion of the undetermined input data processed by the pool of live data services to a third quality metric resultant from a different live data service in the pool of live data services processing a further portion of the undetermined input data.

A twelfth example provides a machine-readable medium according to the tenth example or the eleventh example, wherein:

the selecting of the candidate data service selects the candidate data service from among the pool of live data services processing the undetermined input data.

A thirteenth example provides a machine-readable medium according to the twelfth example, wherein:

the selecting of the candidate data service from among the pool of live data services is based on expiration of a threshold period of time elapsed since the candidate data service was last tested for service quality.

A fourteenth example provides a machine-readable medium according to the tenth example or the eleventh example, wherein:

the data structure indicates that the candidate data service is not to remain in the pool of live data services; and the method further comprises:

removing the candidate data service from the pool of live data services based on the data structure indicating that the candidate data service is not to remain in the pool.

A fifteenth example provides a system (e.g., a computer system of one or more computing machines) comprising:

one or more processors; and a memory storing instructions that, when executed by at least one processor among the one or more processors, cause the system to perform operations comprising:

selecting a candidate data service to be tested for service quality;

performing a first-phase test of the candidate data service by providing predetermined input data to the candidate data service and measuring a first quality metric resultant from the candidate data service processing the predetermined input data;

determining that the candidate data service is to undergo a second-phase test based on the first quality metric resultant from the candidate data service processing the predetermined input data;

performing the second-phase test of the candidate data service, the second-phase test including: adding the candidate data service to a pool of live data services processing undetermined input data; routing a portion of the undetermined input data to the candidate data service; and measuring a second quality metric resultant from the candidate data service processing the routed portion of the undetermined input data processed by the pool of live data services; and recording within a data structure whether the candidate data service is to remain in the pool based on the second quality metric.

A sixteenth example provides a system according to the fifteenth example, wherein:

the recording within the data structure of whether the candidate data service is to remain in the pool is based on a comparison of the second quality metric resultant from the candidate data service processing the routed portion of the undetermined input data processed by the pool of live data services to a third quality metric resultant from a different live data service in the pool of live data services processing a further portion of the undetermined input data.

A seventeenth example provides a system according to the fifteenth example or the sixteenth example, wherein:

the selecting of the candidate data service selects the candidate data service from among the pool of live data services processing the undetermined input data.

An eighteenth example provides a system according to the fifteenth example or the sixteenth example, wherein:

the selecting of the candidate data service selects an available data service outside the pool of live data services processing the undetermined input data.

A nineteenth example provides a system according to the eighteenth example, wherein:

the selecting of the available data service outside the pool of live data services is based on expiration of a threshold period of time elapsed since the available data service was last tested for service quality.

A twentieth example provides a system according to any of the fifteenth through nineteenth examples, wherein:

the data structure indicates that the candidate data service is to remain in the pool of live data services; and the operations further comprise:

leaving the candidate data service in the pool of live data services based on the data structure indicating that the candidate data service is to remain in the pool.

A twenty-first example provides a carrier medium carrying machine-readable instructions for controlling a machine to carry out the operations (e.g., method operations) performed in any one of the previously described examples.

What is claimed is:

1. A method comprising:

selecting, by one or more processors, a candidate communication service to be tested for service quality;

performing, by the one or more processors, a first-phase test of the candidate communication service by providing predetermined input data to the candidate communication service and measuring a first quality metric resultant from the candidate communication service processing the predetermined input data;

determining, by the one or more processors, that the candidate communication service is to undergo a second-phase test based on the first quality metric resultant from the candidate communication service processing the predetermined input data;

performing, by the one or more processors, the second-phase test of the candidate communication service, the second-phase test including:
  adding the candidate communication service to a pool of live communication services processing undetermined input data;
  routing a portion of the undetermined input data to the candidate communication service; and
  measuring a second quality metric resultant from the candidate communication service processing the routed portion of the undetermined input data processed by the pool of live communication services; and based on the second quality metric, determining, by the one or more processors, whether the candidate communication service is to remain in the pool.

2. The method of claim 1, wherein:
determining whether the candidate communication service is to remain in the pool is based on a comparison of the second quality metric resultant from the candidate communication service processing the routed portion of the undetermined input data processed by the pool of live data services to a third quality metric resultant from a different live communication service in the pool of live communication services processing a further portion of the undetermined input data.

3. The method of claim 1, wherein:
the selecting of the candidate communication service selects the candidate communication service from the pool of live data services processing the undetermined input data.

4. The method of claim 3, wherein:
the selecting of the candidate communication service from the pool of live communication services is based on expiration of a threshold period of time elapsed since the candidate communication service was last tested for service quality.

5. The method of claim 1, wherein:
the selecting of the candidate communication service selects an available communication service outside the pool of live communication services processing the undetermined input data.

6. The method of claim 5, wherein:
the selecting of the available communication service outside the pool of live communication services is based on expiration of a threshold period of time elapsed since the available communication service was last tested for service quality.

7. The method of claim 1, further comprising:
responsive to determining that the candidate communication service is not to remain in the pool, removing the candidate communication service from the pool of live communication services.

8. The method of claim 1, further comprising:
responsive to determining that the candidate communication service is not to remain in the pool, leaving the candidate communication service in the pool of live communication services.

9. The method of claim 1, wherein:
the predetermined input data include a reference test message;
the first quality metric is resultant from the candidate communications service processing at least the reference test message, the pool of live communication services includes a live communications service;
the undetermined input data include live user messages; and
the second quality metric is resultant from the candidate communications service processing a routed portion of the live user messages.

10. A non-transitory machine-readable storage medium comprising instructions that, when executed by one or more processors, cause the one or more processors to perform operations comprising:
selecting a candidate communication service to be tested for service quality;
performing a first-phase test of the candidate communication service by providing predetermined input data to the candidate communication service and measuring a first quality metric resultant from the candidate communication service processing the predetermined input data;
determining that the candidate communication service is to undergo a second-phase test based on the first quality metric resultant from the candidate communication service processing the predetermined input data,
performing the second-phase test of the candidate communication service, the second-phase test including:
  adding the candidate communication service to a pool of live communication services processing undetermined input data;
  routing a portion of the undetermined input data to the candidate communication service; and
  measuring a second quality metric resultant from the candidate communication service processing the routed portion of the undetermined input data processed by the pool of live communication services; and
based on the second quality metric, determining whether the candidate communication service is to remain in the pool.

11. The non-transitory machine-readable storage medium of claim 10, wherein:
determining whether the candidate communication service is to remain in the pool is based on a comparison of the second quality metric resultant from the candidate communication service processing the routed portion of the undetermined input data processed by the pool of live data services to a third quality metric resultant from a different live communication service in the pool of live communication services processing a further portion of the undetermined input data.

12. The non-transitory machine-readable storage medium of claim 10, wherein:
the selecting of the candidate communication service selects the candidate communication service from the pool of live data services processing the undetermined input data.

13. The non-transitory machine-readable storage medium of claim 12, wherein:
the selecting of the candidate communication service from the pool of live communication services is based on expiration of a threshold period of time elapsed since the candidate communication service was last tested for service quality.

14. The non-transitory machine-readable storage medium of claim 10, further comprising:

responsive to determining that the candidate communication service is not to remain in the pool, removing the candidate communication service from the pool of live communication services.

15. A system comprising:
one or more processors; and
a memory storing instructions that, when executed by at least one processor among the one or more processors, cause the system to perform operations comprising:
  selecting a candidate communication service to be tested for service quality;
  performing a first-phase test of the candidate communication service by providing predetermined input data to the candidate communication service and measuring a first quality metric resultant from the candidate communication service processing the predetermined input data;
  determining that, the candidate communication service is to undergo a second-phase test based on the first quality metric resultant from the candidate communication service processing the predetermined input data;
  performing the second-phase test of the candidate communication service, the second-phase test including:
    adding the candidate communication service to a pool of live communication services processing undetermined input data;
    routing a portion of the undetermined input data to the candidate communication service; and
    measuring a second quality metric resultant from the candidate communication service processing the routed portion of the undetermined input data processed by the pool of live communication services; and
  based on the second quality metric, determining whether the candidate communication service is to remain in the pool.

16. The system of claim 15, wherein:
determining whether the candidate communication service is to remain in the pool is based on a comparison of the second quality metric resultant from the candidate communication service processing the routed portion of the undetermined input data processed by the pool of live data services to a third quality metric resultant from a different live communication service in the pool of live communication services processing a further portion of the undetermined input data.

17. The system of claim 15, wherein:
the selecting of the candidate communication service selects the candidate communication service from the pool of live data services processing the undetermined input data.

18. The system of claim 15, wherein:
the selecting of the candidate communication service selects an available communication service outside the pool of live communication services processing the undetermined input data.

19. The system of claim 18, wherein:
the selecting of the candidate communication service from the pool of live communication services is based on expiration of a threshold period of time elapsed since the candidate communication service was last tested for service quality.

20. The system of claim 15, further comprising:
responsive to determining that the candidate communication service is not to remain in the pool, leaving the candidate communication service in the pool of live communication services.

* * * * *